(12) United States Patent
Kim et al.

(10) Patent No.: US 11,820,405 B2
(45) Date of Patent: Nov. 21, 2023

(54) INTEGRATED CONTROL APPARATUS FOR AUTONOMOUS VEHICLE

(71) Applicants: HYUNDAI MOTOR COMPANY, Seoul (KR); KIA MOTORS CORPORATION, Seoul (KR); SL Corporation, Daegu (KR)

(72) Inventors: Eun Sik Kim, Gwangmyeong-si (KR); Seok Woo Ye, Daegu (KR); Jae Hoon Jung, Gyeongsan-si (KR); Ji Hoon Yang, Gyeongsan-si (KR)

(73) Assignees: HYUNDAI MOTOR COMPANY, Seoul (KR); KIA MOTORS CORPORATION, Seoul (KR); SL CORPORATION, Daegu (KR)

( * ) Notice: Subject to any disclaimer, the term of this patent is extended or adjusted under 35 U.S.C. 154(b) by 169 days.

(21) Appl. No.: 17/034,885

(22) Filed: Sep. 28, 2020

(65) Prior Publication Data

US 2021/0394799 A1 Dec. 23, 2021

(30) Foreign Application Priority Data

Jun. 22, 2020 (KR) .................. 10-2020-0075858

(51) Int. Cl.
*B60W 60/00* (2020.01)
*G05D 1/00* (2006.01)
*B60K 35/00* (2006.01)

(52) U.S. Cl.
CPC ......... *B60W 60/0053* (2020.02); *B60K 35/00* (2013.01); *G05D 1/0016* (2013.01);
(Continued)

(58) Field of Classification Search
CPC .. B60W 60/0053; B60W 10/10; B60W 10/18; B60W 10/20; B60W 40/105;
(Continued)

(56) References Cited

U.S. PATENT DOCUMENTS 10,879,022 B1 * 12/2020 Levay ................. H01H 23/14
2008/0027590 A1 * 1/2008 Phillips ............... G05D 1/0088
701/2

(Continued)

FOREIGN PATENT DOCUMENTS

KR 10-2012-0046583 A 5/2012

OTHER PUBLICATIONS

Tesla, Model 3 Manual, Jan. 31, 2019 (Year: 2019).*

(Continued)

*Primary Examiner* — Jean Paul Cass
*Assistant Examiner* — Alexander George Matta
(74) *Attorney, Agent, or Firm* — Morgan, Lewis & Bockius LLP (57) ABSTRACT

An integrated control apparatus for an autonomous vehicle includes a mobile control device 10, which is a portable device manipulated by a user, configured to perform steering, speed change, acceleration and braking of the vehicle, and a touch-type stationary display device 20 manipulated in a touch manner by the user and configured to perform functions other than the steering, the speed change, the acceleration and the braking of the vehicle when the vehicle is shifted from an autonomous driving mode to a manual driving mode. A steering dial switch and a speed change slide switch of the mobile control device are manipulated in a manner different from that in which an acceleration button switch and a braking button switch of the mobile control device are manipulated.

13 Claims, 7 Drawing Sheets

(52) U.S. Cl.
CPC .............................. *B60K 2370/135* (2019.05); *B60K 2370/1438* (2019.05); *B60K 2370/175* (2019.05); *B60K 2370/573* (2019.05)

(58) Field of Classification Search
CPC ............... B60W 50/082; B60W 50/14; B60W 2050/143; B60W 2050/146; B60K 35/00; B60K 2370/135; B60K 2370/1438; B60K 2370/175; B60K 2370/573; B60K 2370/126; B60K 2370/128; B60K 2370/131; B60K 2370/143; B60K 2370/152; B60K 2370/178; B60K 2370/33; B60K 2370/695; G05D 1/0016; G05D 1/0066; B60H 3/0078; B60R 11/0229; B60R 16/005; B60R 2011/0003
See application file for complete search history.

(56) References Cited

U.S. PATENT DOCUMENTS

| | | | |
|---|---|---|---|
| 2014/0222252 A1* | 8/2014 | Matters | G05D 1/0011 701/2 |
| 2017/0020536 A1* | 1/2017 | Johnson | A61B 17/92 |
| 2020/0249693 A1* | 8/2020 | Hamilton | B60R 16/0231 |
| 2022/0024449 A1* | 1/2022 | Hayakawa | G07C 9/00309 |

OTHER PUBLICATIONS

Horizon Hobby LLC, DX5 manual, 2019 (Year: 2019).*
The Wayback Machine Archive of NBK website (https://web.archive.org/web/20190728190127/https://www.nbk1560.com/en-US/products/machine_element/handle/HAK/) dated Jul. 28, 2019 (Year: 2019).*

* cited by examiner

INTEGRATED CONTROL APPARATUS FOR AUTONOMOUS VEHICLE

CROSS-REFERENCE TO RELATED APPLICATION

The present application claims the benefit of priority to Korean Patent Application No. 10-2020-0075858, filed on Jun. 22, 2020 in the Korean Intellectual Property Office, the disclosure of which is incorporated herein by reference.

TECHNICAL FIELD

The present disclosure relates to an integrated control apparatus for an autonomous vehicle, and more particularly to an integrated control apparatus provided in an autonomous vehicle so as to be directly manipulated by a user when the autonomous vehicle is shifted from an autonomous driving mode to a manual driving mode.

BACKGROUND

An autonomous vehicle is a smart vehicle into which autonomous technology for enabling a driver to travel to a destination without directly manipulating a handle, an acceleration pedal, a brake pedal or the like is incorporated.

When autonomous driving is universally adopted, a driver may be able to select one among a manual driving mode, in which the driver directly operates a vehicle, and an autonomous driving mode, in which the vehicle travels by itself to a destination without directly operating the vehicle.

When an emergency situation occurs during autonomous driving, someone among the passengers in a vehicle must directly operate the vehicle. To this end, the vehicle must be provided with a device capable of being manipulated by a user in a manual driving mode.

In an example, there is the case in which a person responsible for a vehicle operates a vehicle in a manual driving mode using a device such as a joystick of the type used in game machines. However, because a single joystick is provided with a plurality of buttons and levers and switches using toggles, which are disposed in a complicated fashion, there are disadvantages of difficulty in manipulation and the possibility of inadvertent manipulation.

The information disclosed in the Background section above is to aid in the understanding of the background of the present disclosure, and should not be taken as acknowledgement that this information forms any part of prior art.

SUMMARY

Therefore, the present disclosure has been made in view of the above problems, and it is an object of the present disclosure to provide an integrated control apparatus for an autonomous vehicle, which is provided with a mobile control device for performing steering, speed change, acceleration and braking of the vehicle, and a stationary display device for performing other functions in a touch manner so as to be manipulated by a user when the vehicle is shifted from an autonomous driving mode to a manual driving mode, thereby improving convenience in manipulation and preventing inadvertent manipulation as much as possible.

In accordance with the present disclosure, the above and other objects can be accomplished by the provision of an integrated control apparatus for an autonomous vehicle, which is manipulated by a user when the autonomous vehicle is shifted from an autonomous driving mode to a manual driving mode. The apparatus may include a mobile control device, which is manipulated by the user so as to perform steering, speed change, acceleration and braking in a state of being gripped by a hand of the user, and a stationary display device, which is constructed independently of the mobile control device and which is manipulated in a touch manner by the user so as to perform functions other than the steering, the speed change, the acceleration and the braking.

The mobile control device may be a portable device which is movable to a desired position in the state of being gripped by the hand of the user, and the stationary display device may be a device fixedly mounted in the interior space of the autonomous vehicle.

The functions performed through manipulation of the stationary display device may include a function of operating lamps mounted on front and rear portions of the vehicle, a function of generating an alarm sound and a function of changing a driving mode.

The mobile control device may include a housing including a grip part, which is gripped by a hand of the user, and a switch part, which is bent from the grip part at a predetermined angle and extends therefrom, a steering dial switch disposed on an upper surface of the switch part so as to be rotatably manipulated by a hand of the user, an acceleration button switch and a braking button switch, which are disposed on a region of an upper surface of the housing, at which the grip part and the switch part are connected to each other and which are manipulated in a manner of being pushed by a finger of the user, and a speed change slide switch disposed on a side surface of the switch part so as to be pushed or pulled by a finger of the user.

The steering dial switch, the acceleration button switch and the speed change slide switch may be manipulated in different manners so as to prevent inadvertent manipulation thereof, and the acceleration button switch and the braking button switch may be manipulated in the same manner.

The mobile control device may include permanent magnets respectively coupled to the steering dial switch, the acceleration button switch, the braking button switch and the speed change slide switch, and a PCB fixedly mounted on the housing so as to face the permanent magnets, the PCB generating any one of a signal pertaining to steering, a signal pertaining to acceleration, a signal pertaining to braking or a signal pertaining to speed change based on variation in magnetic flux due to a change in the position of the permanent magnets.

The steering dial switch and the speed change slide switch may be manipulated by a remaining hand not gripping the housing, and the acceleration button switch and the braking button switch may be manipulated by a finger of the hand gripping the housing or by the remaining hand not gripping the housing.

The housing may be configured to have an "L" shape, in which the switch part extends leftwards or rightwards from an upper end of the grip part, and the grip part may be configured to have a smaller sectional area than that of the switch part so as to be easily gripped by the hand of the user.

The housing may be configured to have an "L" shape in which the switch part extends leftwards or rightwards from an upper end of the grip part, and the switch part may be configured to be longer than the grip part so as to prevent an interference between the hand of the user manipulating the steering dial switch and the hand of the user gripping the grip part.

The steering dial switch may be rotated in a first direction, which is clockwise or counterclockwise, with respect to the housing by the hand of the user, and may be rotated in an opposite direction to the first direction and returned to an initial position by an elastic force when the manipulation force of the user applied thereto is released.

The steering dial switch may include a power handle, which is rotatably manipulated by a finger of the user placed thereon with a small amount of power relative to an amount of power when the steering dial switch does not include the power handle.

Each of the acceleration button switch and the braking button switch may include an inclined surface inclined upwardly at a predetermined angle toward the steering dial switch with respect to a longitudinal direction of the grip part so as to be easily manipulated by a finger of the hand gripping the grip part.

The acceleration button switch and the braking button switch may be positioned parallel to each other.

Each of the acceleration button switch and the braking button switch may be a pedal-type button switch, which is rotatably mounted on the housing via a rotational shaft such that each switch is rotated about the rotational shaft when the user pushes an upper surface thereof, and may be rotated in the opposite direction about the rotational shaft and returned to the initial position thereof by an elastic force when the pushing force of the user applied thereto is released.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, an integrated control apparatus for an autonomous vehicle according to exemplary embodiments of the present disclosure will be described with reference to the accompanying drawings.

The integrated control apparatus for an autonomous vehicle 1 according to an exemplary embodiment of the present disclosure is designed to be directly manipulated by a person responsible for the vehicle so as to operate the vehicle in a manual driving mode in the event of an emergency during autonomous traveling, as illustrated in FIGS. 1 to 7.

Figure 1:
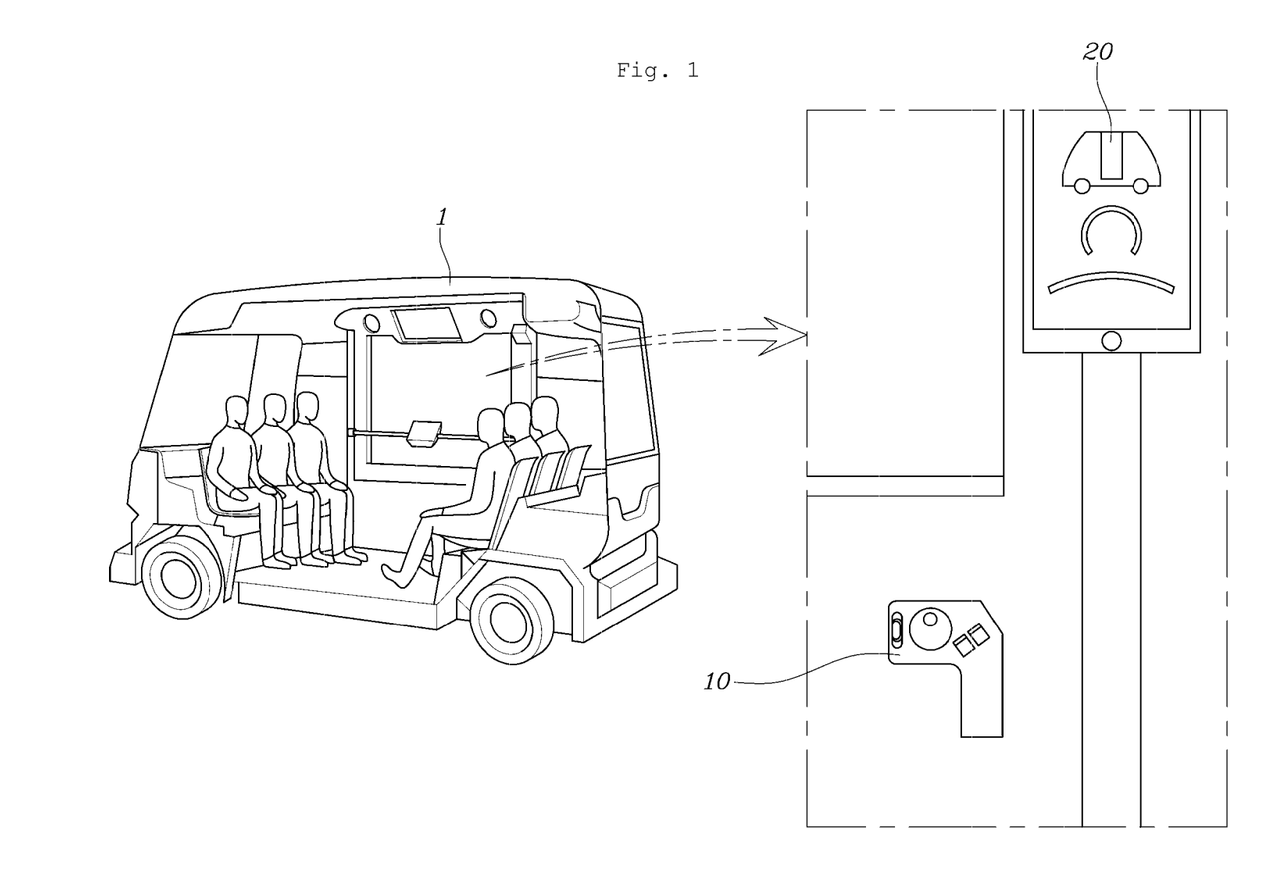
FIG. 1 is a view illustrating an autonomous vehicle which is provided with an integrated control apparatus according to an exemplary embodiment of the present disclosure.

Specifically, the integrated control apparatus for an autonomous vehicle according to an exemplary embodiment of the present disclosure includes a mobile control device 10, which is manipulated so as to perform steering, speed change, acceleration and braking in the state of being gripped by a user's hand 2, and a stationary display device 20, which is constructed independently of the mobile control device 10 and which is manipulated in a touch manner by the user so as to perform functions other than the steering, the speed change, the acceleration and the braking.

The mobile control device 10 may be a portable control device capable of being moved to a desired position in the state of being gripped by the hand of the user's hand 2, and the stationary display device 20 may be a device that is fixedly mounted in the interior space in the autonomous vehicle 1. The mobile control device 10 and the stationary display device 20 may be constructed independently of each other.

The mobile control device 10 may be called a "lever-type control device" depending on the external shape thereof.

Other functions performed through manipulation of the stationary display device 20 include a function of operating lamps mounted on front and rear portions of the vehicle, a function of generating an alarm sound and a function of changing a driving mode.

The lamps of the vehicle may include various kinds of lamps mounted on the vehicle. The lamps may include at least one of a head lamp, a fog lamp, a signal lamp, a tail lamp, a warning lamp, or the like.

The driving modes between which the vehicle is capable of being shifted include an autonomous driving mode and a manual driving mode.

The integrated control apparatus according to an exemplary embodiment of the present disclosure is constructed so as to perform steering, speed change, acceleration and braking of the vehicle through manipulation of the mobile control device 10, which corresponds to a portable device, and to perform other functions of the vehicle through manipulation of the touch-type stationary display device 20. The integrated control apparatus has advantages of being easily and conveniently manipulated and of preventing inadvertent manipulation as much as possible by performing various control functions of the vehicle using the mobile control device 10 and the touch-type stationary display device 20, which are constructed independently of each other.

Furthermore, the mobile control device 10, which is a portable device capable of being moved to a desired position in the state of being gripped by a hand of a user, has an advantage of being easily manipulated by virtue of decreased volume and weight thereof.

Figure 2:
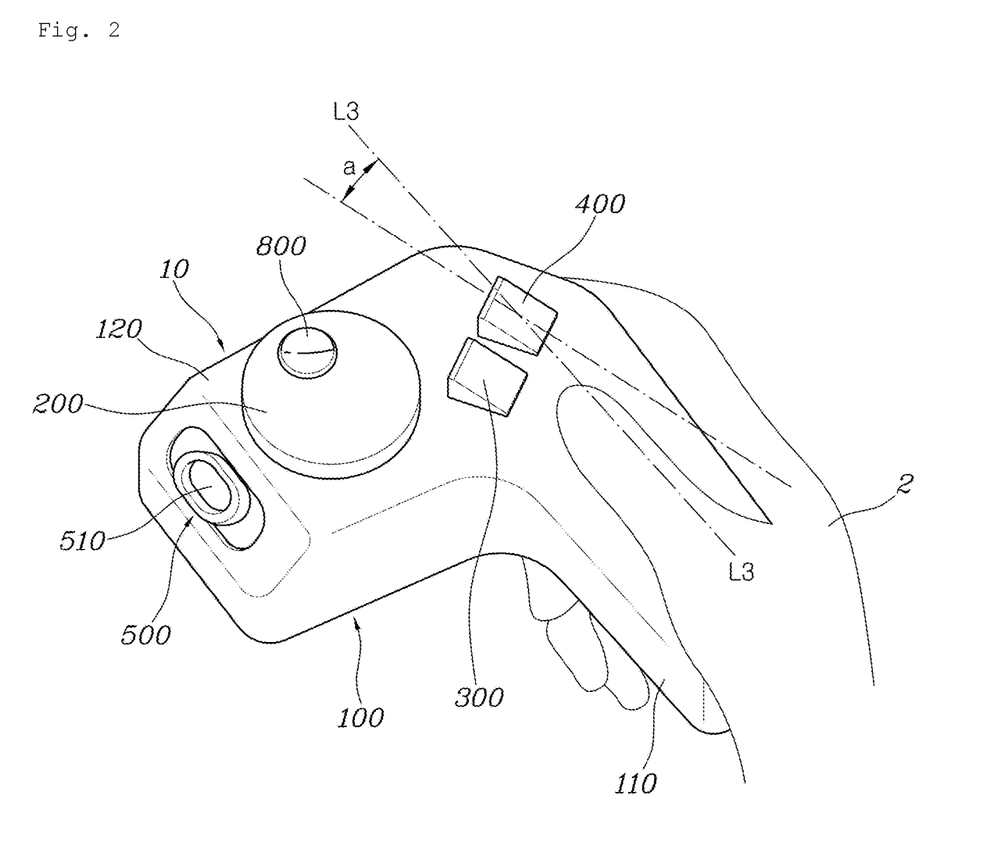
FIGS. 2 and 3 are perspective views of a mobile control device according to an exemplary embodiment of the present disclosure.
Figure 3:
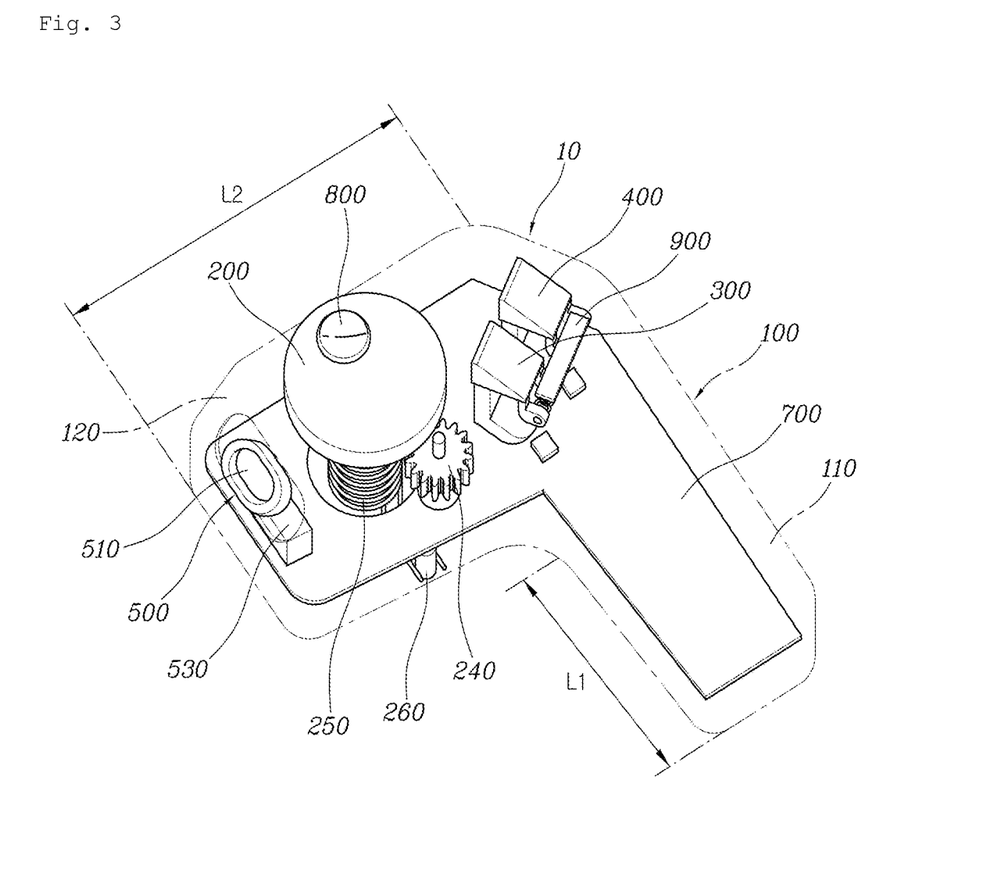

The mobile control device 10 according to an exemplary embodiment of the present disclosure may have a housing 100 including a grip part 110, which can be gripped by a user's hand 2, and a switch part 120, which may be bent from the grip part 110 at a predetermined angle and extend therefrom; a steering dial switch 200 disposed on the upper surface of the switch part 120 so as to be rotatably manipulated by the user; an acceleration button switch 300 and a braking button switch 400, which are disposed on a region of the upper surface of the housing 100 at which the grip part 110 and the switch part 120 are connected to each other and which are manipulated in a manner of being pushed by a finger of a user; and a speed change slide switch 500 disposed on a side surface of the switch part 120 so as to be pushed or pulled by a finger of the user.

The grip part 110 of the housing 100 may be configured to have a linear lever shape, and the switch part 120 may extend, e.g., leftwards or rightwards, from the upper end of the grip part 110, such that the housing 100 may be in an "L"-shaped appearance.

The grip part 110 may be characterized by having a smaller sectional area than that of the switch part 120 so as to be easily gripped by a hand of a user, and the switch part 120 may be characterized by being longer than the grip part 110 so as to prevent an interference between the hand (e.g., the left hand) manipulating the steering dial switch 200 and the other hand (e.g., the right hand), which is gripping the grip part 110.

In other words, the mobile control device 10 may be constructed such that the length L1 of the grip part 110 is longer than the length L2 of the switch part 120.

According to an exemplary embodiment of the present disclosure, the steering dial switch 200, the acceleration button switch 300 and the speed change slide switch 500 are characteristically manipulated in different manipulation manners so as to prevent inadvertent manipulation thereof. The acceleration button switch 300 and the braking button switch 400 may be buttons that are manipulated for acceleration and deceleration of the vehicle and may be characteristically configured to be manipulated in the same consistent manner. However, the acceleration button switch 300 and the braking button switch 400 may be configured to be manipulated in a different manner when necessary.

For example, the grip part 110 of the mobile control device 10 may be gripped by a user's right hand 2, and the steering dial switch 200 and the speed change slide switch 500 may be manipulated by the user's other hand, which is not gripping the housing 100, that is, the user's left hand. The steering dial switch 200 may be manipulated by all of the fingers of the user's left hand, and the speed change slide switch 500 may be manipulated by the thumb or forefinger of the user's left hand in a pushing or pulling manner.

The acceleration button switch 300 and the braking button switch 400 may be manipulated by the thumb of the user's right hand gripping the housing 100 or by any finger of the user's hand not gripping the housing 100, that is, any finger of the user's left hand.

Figure 4:
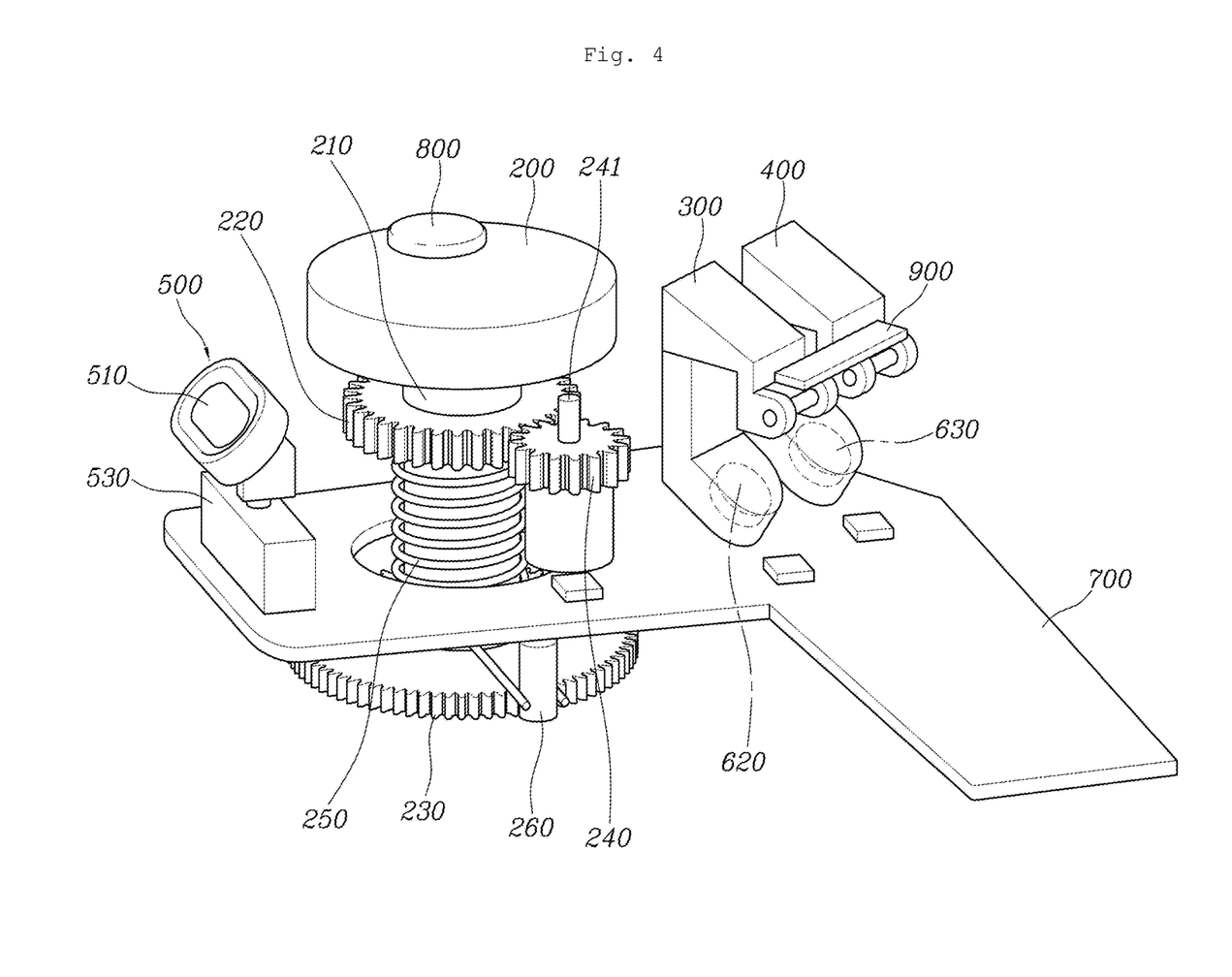
FIG. 4 is a view of the mobile control device shown in FIG. 2, from which a housing is removed.

The mobile control device according to an exemplary embodiment of the present disclosure may further include permanent magnets 610, 620, 630 and 640, which are respectively coupled to the steering dial switch 200, the acceleration button switch 300, the braking button switch 400 and the speed change slide switch 500, and a PCB (printed circuit board) 700, which is fixedly mounted on the housing 100 so as to face the permanent magnets 610, 620, 630 and 640.

The PCB 700 may generate any one of a signal pertaining to steering, a signal pertaining to acceleration, a signal pertaining to braking, or a signal pertaining to speed change.

Figure 5:
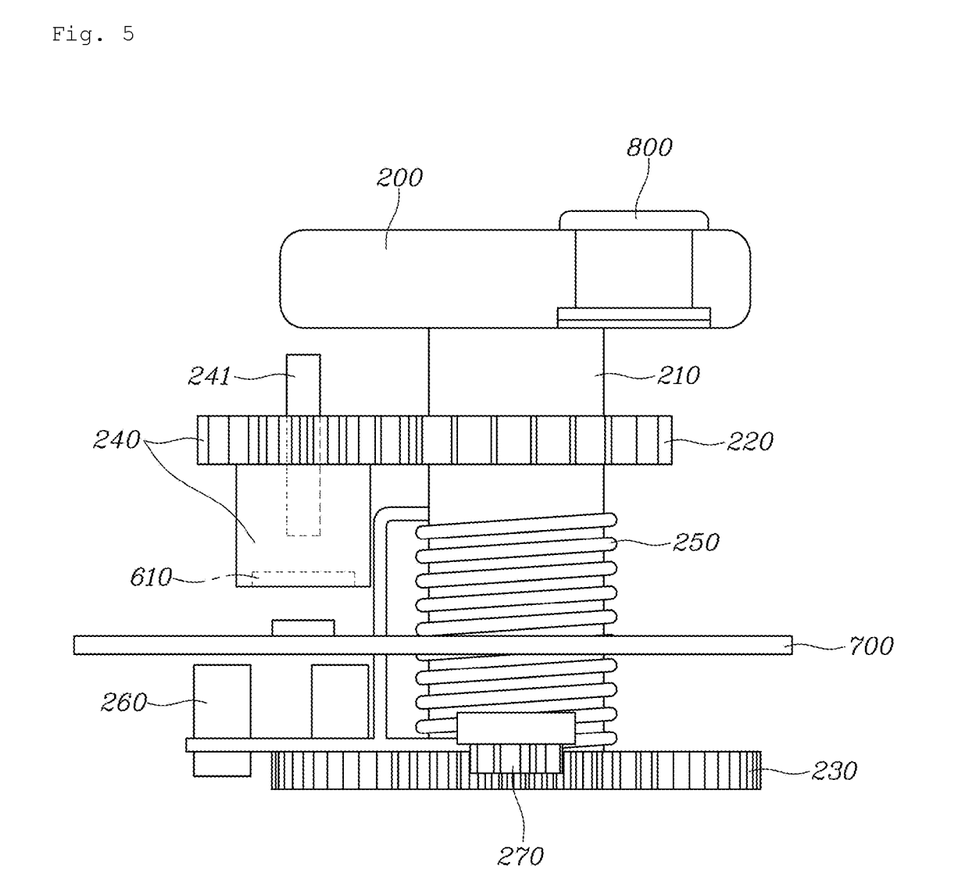
FIG. 5 is a view illustrating a steering dial switch according to an exemplary embodiment of the present disclosure.

As illustrated in FIG. 5, the steering dial switch 200 may be mounted so as to be exposed through the upper surface of the switch part 120 of the housing 100, and may be integrally coupled to a dial shaft 210 so as to be rotatable with respect to the housing 100.

An upper gear 220 and a lower gear 230 may be integrally coupled to the dial shaft 210 in a manner such that the dial shaft 210 extends through respective centers of the upper gear 220 and the lower gear 230, which are vertically spaced apart from each other. The upper gear 220 may be engaged with a sensing gear 240 at the outer circumferential surfaces thereof. A gear shaft 241 may be coupled to the center of the sensing gear 240, and may be rotatably coupled to the housing 100. The permanent magnet 610 may be coupled to the sensing gear 240 so as to face the PCB 700.

The dial shaft 210 may be surrounded by a return spring 250, and two ends of the return spring 250 may be supported by an outer surface of a stopper protrusion 260. The stopper protrusion 260 may be fixedly mounted on the housing 100.

The lower gear 230 may be engaged with a damper 270 at the outer circumferential surfaces thereof. The damper 270 serves to delay the returning speed of the lower gear 230 using the elastic force thereof, thereby preventing generation of noise and shocks.

According to an exemplary embodiment of the present disclosure, when a user rotates the steering dial switch 200 clockwise or counterclockwise, the position of the permanent magnet 610 may change due to the rotation of the dial shaft 210. At this point, the PCB 700 may recognize the rotation of the steering dial switch 200 through variation in magnetic flux attributable to the change in the position of the permanent magnet 610, and thus generate a signal pertaining to steering.

Furthermore, when the dial shaft 210 is rotated by the clockwise or counterclockwise rotation of the steering dial switch 200 by the user, the return spring 250 may accumulate an elastic force while being compressed. When the manipulating force applied to the steering dial switch 200 by a user is released, the steering dial switch 200 may be rotated in the opposite direction and returned to the initial position by the elastic force.

The steering dial switch 200 may further include a power handle 800, which may have a cylindrical shape. The upper surface of the power handle 800 may be positioned so as to be exposed from the upper surface of the steering dial switch 200.

The upper surface of the power handle 800 may have a concave shape so as to allow a finger of a user to be placed therein. When a user places his/her forefinger on the upper surface of the power handle 800 and then applies a small turning force thereto, the entire steering dial switch 200 may be rotated relative to the housing 100.

The acceleration button switch 300 and the braking button switch 400 may be positioned at the region of the upper surface of the housing 100 at which the grip part 110 and the switch part 120 are connected to each other, so as to be exposed from the upper surface of the housing 100. The acceleration button switch 300 and the braking button switch 400 may be manipulated by a thumb of a user's right hand while the grip part 110 is gripped by the hand of the user's right hand.

To this end, the acceleration button switch 300 and the braking button switch 400 may include an inclined surface included upwardly toward the steering dial switch 200 at a predetermined angle (a) with respect to the longitudinal reference line L3 such that the acceleration button switch 300 and the braking button switch 400 can be easily manipulated by a finger of a user's hand 2 gripping the grip part 110. Although it is preferable that the acceleration button switch 300 and the braking button switch 400 be inclined at an angle of 45 degrees or less with respect to the reference line L3 such that the acceleration button switch 300 and the braking button switch 400 can be easily manipulated by the thumb of a user's hand 2 that is gripping the grip part 110 in consideration of ergonomics, the present disclosure is not limited thereto.

The braking button switch 400 may be positioned near a lateral side of the acceleration button switch 300. Although it is preferable that the acceleration button switch 300 and the braking button switch 400 be positioned so as to be oriented parallel to each other in consideration of ergonomics, the present disclosure is not limited thereto.

Figure 6:
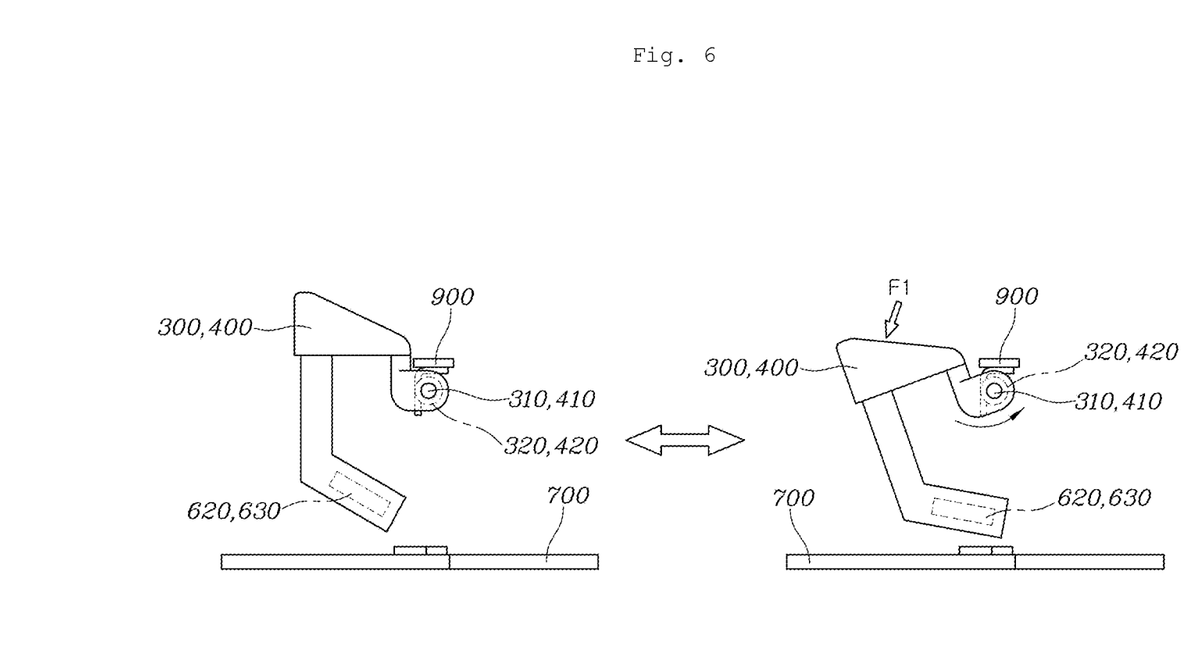
FIG. 6 is view illustrating an acceleration button switch and a braking button switch according to an exemplary embodiment of the present disclosure.

As illustrated in FIG. 6, the acceleration button switch 300 and the braking button switch 400 may be constructed so as to have the same structure as each other. Specifically, the upper ends of the acceleration button switch 300 and the braking button switch 400 may be rotatably mounted on the housing 100 via rotational shafts 310 and 410, respectively, and the rotational shafts 310 and 410 may be respectively surrounded by return springs 320 and 420. First ends of the return springs 320 and 420 may be fixedly coupled to the housing 100, and second ends of the return springs 320 and 420 may be fixedly coupled to the acceleration button switch 300 and the braking button switch 400, respectively.

The permanent magnets 620 and 630 may be respectively coupled to the lower ends of the acceleration button switch 300 and the braking button switch 400 so as to face the PCB 700.

When a user pushes and presses the upper surface of the acceleration button switch 300 or the braking button switch 400 (see arrow 'F1' in FIG. 6), the acceleration button switch 300 or the braking button switch 400 may be rotated counterclockwise about the rotational shaft 310 or 410. At this time, the position of the permanent magnet 620 or 630 may change due to the rotation of the acceleration button switch 300 or the braking button switch 400, and the PCB 700 may recognize the rotation of the acceleration button switch 300 or the braking button switch 400 through the variation in magnetic flux due to the change in the position of the permanent magnet 620 or 630 and generate a signal pertaining to acceleration or a signal pertaining to braking.

Furthermore, when the user manipulates and rotates the acceleration button switch 300 or the braking button switch 400 counterclockwise, the return spring 320 or 420 may accumulate an elastic force while being compressed. When the user releases the manipulating force applied to the acceleration button switch 300 or the braking button switch 400, the acceleration button switch 300 or the braking button switch 400 may be rotated clockwise and is thus returned to the initial position thereof by the elastic force.

When the acceleration button switch 300 or the braking button switch 400 is rotated and returned to the initial position thereof by the elastic force, the acceleration button switch 300 or the braking button switch 400 may come into contact with a stopper plate 900 and thus stopped at the initial position thereof. The stopper plate 900 may be fixedly coupled to the housing 100.

The acceleration button switch 300 and the braking button switch 400 may be pedal-type button switches, which are rotatable about rotational shafts 310 and 410 respectively with respect to the housing 100.

Figure 7:
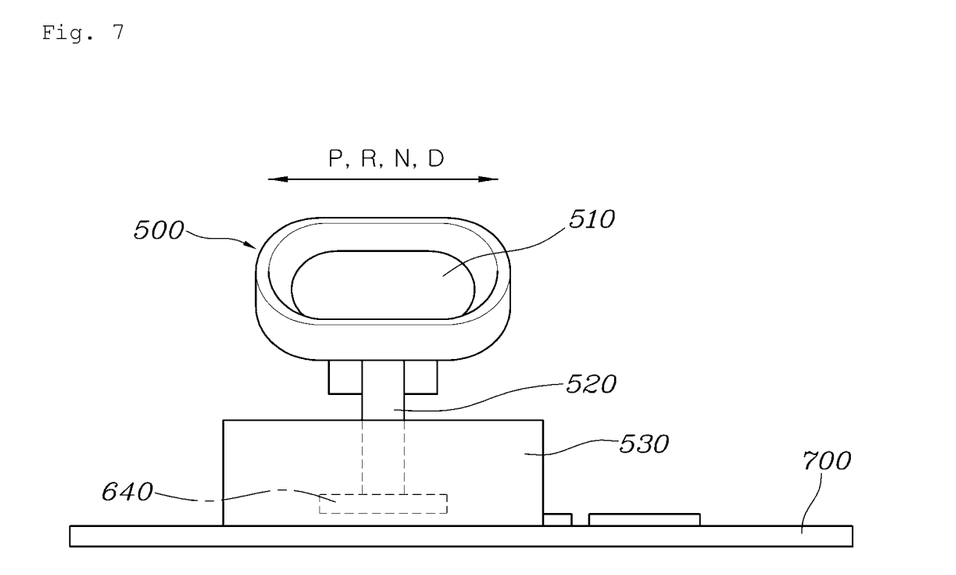
FIG. 7 is a view illustrating a speed change slide switch according to an exemplary embodiment of the present disclosure.

The speed change slide switch 500 may be positioned at a side surface of the switch part 120 so as to be pushed or pulled by the thumb or forefinger of a user's left hand while the grip part 110 is gripped by the hand of the user's right hand.

As illustrated in FIG. 7, a knob 510 of the speed change slide switch 500 may be integrally coupled to a rod 520. The rod 520 may be constructed so as to reciprocate linearly with respect to a switch body 530. The permanent magnet 640 may be coupled to the rod 520 so as to face the PCB 700.

The switch body 530 may have a groove formed therein such that the rod 520 is held in position in the groove during manipulation of the knob 510. Particularly, the switch body 530 may be provided with a spring so as to increase the required manipulation force.

According to an exemplary embodiment of the present disclosure, when a user pushes or pulls the knob 510 of the speed change slide switch 500 with the thumb or forefinger of his/her left hand while gripping the grip part 110 with his/her right hand, the position of the permanent magnet 640 may change due to the movement of the permanent magnet 640. At this time, the PCB 700 may recognize the movement of the speed change slide switch 500 by variation in magnetic flux due to the change in the position of the permanent magnet 640, and generate a signal pertaining to speed change.

As is apparent from the above description, the integrated control apparatus for an autonomous vehicle according to an exemplary embodiment of the present disclosure may be constructed such that the mobile control device 10, which corresponds to a portable device, is manipulated by a user so as to perform steering, speed change, acceleration and braking of the vehicle and that the touch-type stationary display device 20 is manipulated by the user so as to perform other functions of the vehicle when the vehicle is shifted from an autonomous driving mode to a manual driving mode. Accordingly, it is easy and convenient to manipulate the integrated control apparatus. Particularly, since various manipulation functions of the vehicle are performed by the mobile control device 10 and the touch-type display device 20, which are constructed independently of each other, there is an advantage of making it possible to prevent inadvertent manipulation as much as possible.

Furthermore, since the mobile control device 10, which is capable of being moved to a desired position in the state of being gripped by a user's hand, has decreased volume and weight, there is an advantage of making it easy to manipulate.

Furthermore, since the steering dial switch 200 and the speed change slide switch 500, which are provided in the mobile control device 10, are manipulated in a manner different from the manner in which the acceleration button switch 300 and the braking button switch 400 are manipulated, there is an advantage of making it possible to prevent inadvertent manipulation as much as possible.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. An integrated control apparatus for an autonomous vehicle, which is manipulated by a user when the autonomous vehicle is shifted from an autonomous driving mode to a manual driving mode, comprising:
   a mobile control device, which is manipulated by the user, configured to perform steering, speed change, acceleration and braking in a state of being gripped by a hand of the user; and
   a stationary display device, which is constructed independently of the mobile control device and manipulated in a touch manner by the user, configured to perform functions other than the steering, the speed change, the acceleration and the braking,
   wherein the mobile control device includes:
      a housing including a grip part, which is gripped by a hand of the user, and a switch part;
      a steering dial switch disposed on an upper surface of the switch part so as to be rotatably manipulated by a hand of the user, and having a dial shaft to be integrally coupled thereto;
      an acceleration button switch and a braking button switch, which are disposed on a region of an upper surface of the housing, at which the grip part and the switch part are connected to each other, the acceleration button switch and the braking button switch being manipulated in a manner of being pushed by a finger of the user; and a speed change slide switch disposed on a side surface of the switch part so as to be pushed or pulled by a finger of the user, and including a knob and a rod, wherein the steering dial switch includes a power handle, which is rotatably manipulated by a finger of the user placed thereon with a small amount of power relative to an amount of power when the steering dial switch does not include the power handle, wherein the power handle penetrates from an upper surface to a lower surface of the steering dial switch and protrudes from the upper surface of the steering dial switch, wherein the dial shaft includes an upper gear and a lower gear which are vertically spaced apart from each other, and the lower gear is engaged with a damper at outer circumferential surfaces thereof, and wherein the switch part includes a groove such that the rod is held in position in the groove during manipulation of the knob.

2. The integrated control apparatus according to claim 1, wherein the mobile control device is a portable device which is movable to a desired position in the state of being gripped by the hand of the user, and the stationary display device is a device that is fixedly mounted in an interior space of the autonomous vehicle.

3. The integrated control apparatus according to claim 1, wherein said functions, which are performed through manipulation of the stationary display device, include a function of operating lamps mounted on front and rear portions of the vehicle, a function of generating an alarm sound and a function of changing a driving mode.

4. The integrated control apparatus according to claim 1, wherein the mobile control device includes:

permanent magnets respectively coupled to the steering dial switch, the acceleration button switch, the braking button switch and the speed change slide switch; and a PCB fixedly mounted on the housing so as to face the permanent magnets, the PCB generating any one of a signal pertaining to steering, a signal pertaining to acceleration, a signal pertaining to braking, or a signal pertaining to speed change based on variation in magnetic flux due to a change in position of the permanent magnets.

5. The integrated control apparatus according to claim 1, wherein the steering dial switch and the speed change slide switch are manipulated by a remaining hand not gripping the housing, and the acceleration button switch and the braking button switch are manipulated by a finger of the hand gripping the housing or by the remaining hand not gripping the housing.

6. The integrated control apparatus according to claim 1, wherein the housing is configured to have an "L" shape in which the switch part extends leftwards or rightwards from an upper end of the grip part, and the grip part is configured to have a smaller sectional area than a sectional area of the switch part so as to be easily gripped by the hand of the user.

7. The integrated control apparatus according to claim 1, wherein the housing is configured to have an "L" shape in which the switch part extends leftwards or rightwards from an upper end of the grip part, and the switch part is configured to be longer than the grip part so as to prevent an interference between the hand of the user manipulating the steering dial switch and the hand of the user gripping the grip part.

8. The integrated control apparatus according to claim 1, wherein the steering dial switch is configured to be rotated in a first direction, which is clockwise or counterclockwise, with respect to the housing by the hand of the user, and rotated in an opposite direction to the first direction and returned to an initial position by an elastic force when a manipulation force of the user applied thereto is released.

9. The integrated control apparatus according to claim 1, wherein each of the acceleration button switch and the braking button switch includes an inclined surface inclined upwardly at a predetermined angle toward the steering dial switch with respect to a longitudinal direction of the grip part so as to be manipulated by a finger of the hand gripping the grip part.

10. The integrated control apparatus according to claim 9, wherein the acceleration button switch and the braking button switch are oriented parallel to each other.

11. The integrated control apparatus according to claim 1, wherein each of the acceleration button switch and the braking button switch is a pedal-type button switch, which is configured to be rotatably mounted on the housing via a rotational shaft such that each switch is rotated about the respective rotational shaft when the user pushes an upper surface thereof, and is rotated in an opposite direction about the rotational shaft and returned to an initial position by an elastic force when the pushing force of the user applied thereto is released.

12. The integrated control apparatus according to claim 1, wherein the acceleration button switch and the braking button switch are the same type of button switch as each other.

13. The integrated control apparatus according to claim 1, wherein the steering dial switch, the acceleration button switch, the braking button switch, and the speed change slide switch are disposed to be spaced apart from each other.

\* \* \* \* \*